(12) United States Patent
Garland et al.

(10) Patent No.: US 6,389,120 B1
(45) Date of Patent: May 14, 2002

(54) METHOD AND APPARATUS FOR MULTIPLE LOGICAL CHANNEL INFORMATION DELIVERY OVER MULTIPLE SUPPRESSED RINGING PHYSICAL CHANNELS

(75) Inventors: Stuart Mandel Garland, Morton Grove; David B. Smith, Hinsdale, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/390,510

(22) Filed: Sep. 3, 1999

(51) Int. Cl.[7] .............................................. H04M 11/00
(52) U.S. Cl. ................. 379/93.01; 379/93.08; 379/93.07
(58) Field of Search ........................... 379/93.01, 93.08, 379/93.07; 707/10; 709/217, 219, 218, 227; 370/235, 229

(56) References Cited

U.S. PATENT DOCUMENTS

| | | | |
|---|---|---|---|
| 5,189,694 A | 2/1993 | Garland | 379/106 |
| 5,359,641 A | 10/1994 | Schull et al. | 379/106 |
| 5,579,381 A | 11/1996 | Courville et al. | 379/201 |
| 5,841,840 A | 11/1998 | Smith et al. | 379/93.01 |
| 6,307,839 B1 * | 10/2001 | Gerszberg et al. | 370/235 |

* cited by examiner

Primary Examiner—Stella Woo
(74) Attorney, Agent, or Firm—The Hill Law Firm LTD

(57) ABSTRACT

A server (102, 204, 208) communicates with a modem, computer or other data communications device (104) to provide, for example, an information delivery service. The server produces multiple channels of data for delivery. The server uses multiple telephone lines to create a high-speed communications channel when necessary. Suppressed ringing connections are made from the server to facilitate data communications over the multiple lines of the multiple channels of data produced by the server.

32 Claims, 3 Drawing Sheets

METHOD AND APPARATUS FOR MULTIPLE LOGICAL CHANNEL INFORMATION DELIVERY OVER MULTIPLE SUPPRESSED RINGING PHYSICAL CHANNELS

FIELD OF THE INVENTION

The present invention relates generally to telecommunications, and in particular, to a method and apparatus for delivery of information over multiple suppressed ringing physical channels.

BACKGROUND OF THE INVENTION

The advantages of using multiple physical channels to transmit information are known. One primary advantage of delivery of information over multiple physical channels is that the amount of information that can be delivered increases proportionately with an increase in the number of physical channels for delivery. The advantages of multiple physical channels are exploited in the use of multiple line modems and other multiple line data communications equipment. Multiple line modems and other data communications equipment use multiple telephone lines to collectively provide a high-speed data path. With the advent of the Internet and other data communications needs, the necessity of high-speed paths is tremendous.

One problem with using multiple telephone lines to provide multiple physical channels in data communications is the complexity of control required to coordinate use of multiple telephone lines. In particular, features associated with a telephone line, such as call forwarding and call blocking, may make coordination of multiple lines complex, and in some cases not feasible, especially where the multiple lines are also used for voice. Also, call establishment is complicated.

Suppressed ringing telephone connections are known. For example, U.S. Pat. No. 5,189,694, issued to Garland, entitled "Telemetry Access Arrangement," discloses a suppressed ringing telephone connection for accessing a meter at a customer premises with a data accessing device. A suppressed ringing connection allows the two units to exchange signals without alerting a customer via ringing and without regard to certain features assigned to the telephone line.

The present invention uses the advantages of suppressed ringing connections over telephone lines to address the shortcomings of using multiple telephone lines to provide multiple physical channels in data communications.

SUMMARY OF THE INVENTION

In accordance with the present invention, an apparatus for data communications includes a server, a customer premises equipment, such as a modem, computer or data communications terminal, and a plurality of telephone lines connected to the customer premises equipment. The server includes a plurality of channels for data communications. A suppressed ringing connection couples the plurality of channels of the server with the plurality of telephone lines connected to the customer premises equipment, such that data communications is accomplished between the server and the customer premises equipment. The server establishes the suppressed ringing connection by placing calls over trunks, channels or lines designated to make suppressed ringing connections. Each of the plurality of channels from the server is directed to one of the plurality of telephone lines connected to the customer premises equipment in one arrangement. In another arrangement, a router/multiplexor receives the plurality of channels from the server and distributes and multiplexes the channels for delivery to the plurality of telephone lines connected to the customer premises equipment.

A method in accordance with the present invention includes the step of determining how many lines are available at a customer premises for data communications. Then suppressed ringing connections are completed to the lines available at the customer premises. After the suppressed ringing connections are established, data is transferred over the available lines using the suppressed ringing connections. The number of lines available for data communications at a customer premises is transmitted during a call from the customers premises to a server or is pre-subscribed in advance. A customer premises equipment that is connected to the plurality of lines at the customer premises may further route the data received over the suppressed ringing connections to other devices at the customer premises.

DETAILED DESCRIPTION OF THE PREFERRED EMBODIMENTS

Figure 1:
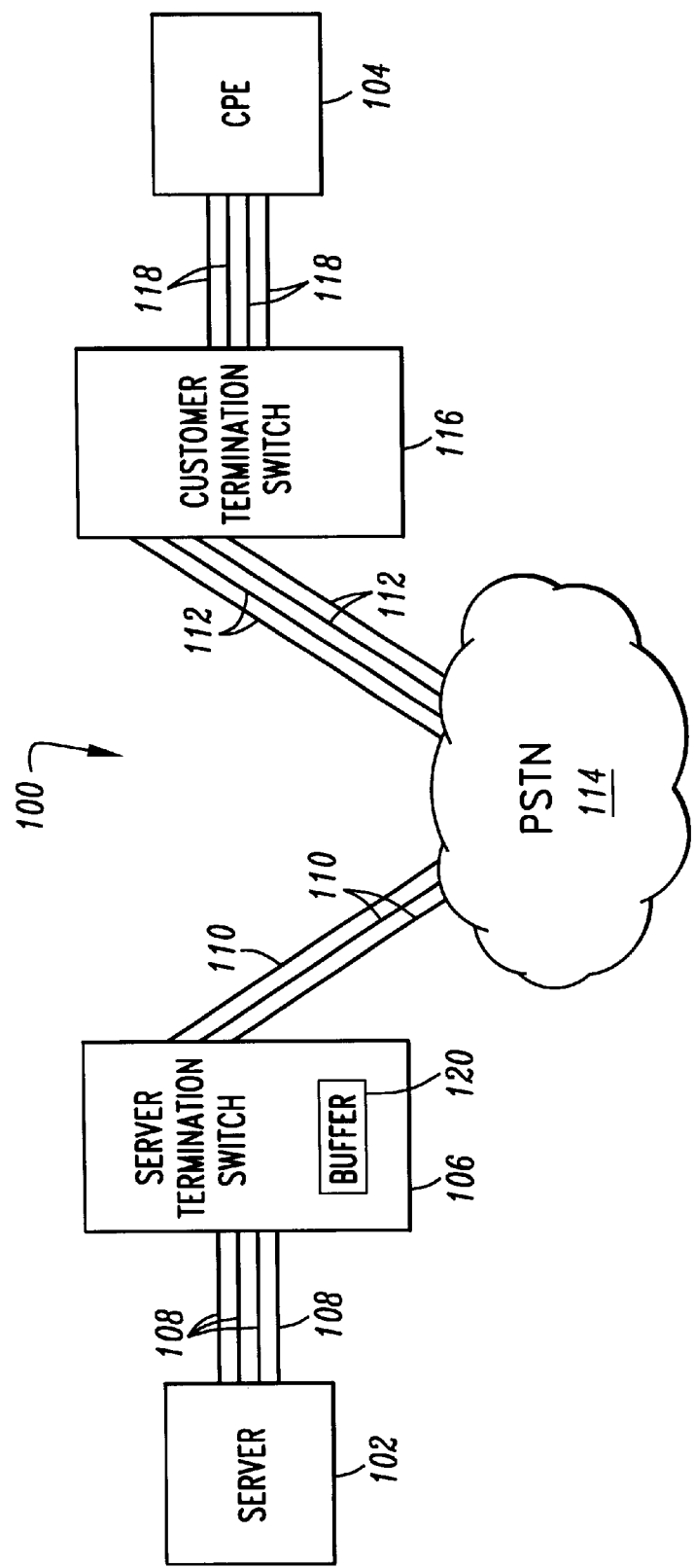
FIG. 1 is a block diagram of an apparatus for data communications in accordance with the present invention.

FIG. 1 is block diagram of a preferred embodiment of a system 100 for data communications in accordance with the present invention. System 100 includes a server 102 and a customer premises equipment 104. In accordance with the present invention, server 102 communicates multiple channels of data to customer premises equipment 104 via multiple suppressed ringing connections made through a telephone network. Server 102 is coupled to a server termination switch 106 via trunks or lines 108. Trunks or lines 108 provide a medium or channel for communication between server 102 and server termination switch 106. Server termination switch 106 is coupled to the public switched telephone network 114 via trunks 110. Customer premises equipment 104 is coupled to a customer termination switch 116 via lines 118. Customer termination switch 116 is coupled to the public switched telephone network 114 via trunks 112.

Server 102 is preferably a general or special purpose computer. Server 102 generates a plurality of channels of information for communication to another device. Server 102 uses trunks or lines 108 for communicating the multiple channels of information generated by server 102 to the public switched telephone network. Though preferably a computer, server 102 is any data communications device.

Trunks or lines 108 are preferably special purpose trunks, for example, utility telemetry trunks, which are capable of establishing suppressed ringing connections over the public switched telephone network with a device. Alternatively, trunks or lines 108 are capable of establishing a request for a suppressed ringing connection to a destination device, for example, via an ISDN control channel, for example, an ISDN user part or ISUP set-up message. Trunks or lines 108 are for digital or analog communication.

Server termination switch 106 is a telecommunications switch that terminates lines to subscribers and couples those lines to the public switched telephone network 114. Server termination switch 106 is preferably a 5ESS switch available from Lucent Technologies, Murray Hill, N.J. Server termination switch 106 receives request for suppressed ringing connections from server 102 via trunks or lines 108. Server termination switch 106 preferably includes a buffer 120 that stores channels of information or data from server 120 or customer premises equipment 104. Most preferably, buffer 120 stores data from server 120 to adjust for speed differences between data communications over lines 118 and lines 108.

Trunks 110, 112 are trunks for connecting telecommunication switches together to form the public switched telephone network. Customer termination switch 116 is similar to server termination switch 106 and terminates subscriber lines and couples them to the public switched telephone network 114. Customer termination switch 116 is preferably a 5ESS switch from Lucent Technologies, Murray Hill, N.J.

Customer premises equipment 104 is any data communications equipment available at a customer premises. Preferably, customer premises equipment 104 is a modem, personal computer or data communications terminal. Lines 118 are subscriber telephone lines.

In one embodiment, server termination switch 106 and customer termination switch 116 are actually the same switch and both server 102 and customer premises equipment 104 are directly coupled to the switch via trunks or lines 108 and subscriber lines 118, respectively. In this embodiment suppressed ringing connections between server 102 and customer premises equipment 104 are made directly by a single telecommunications switch.

Figure 2:
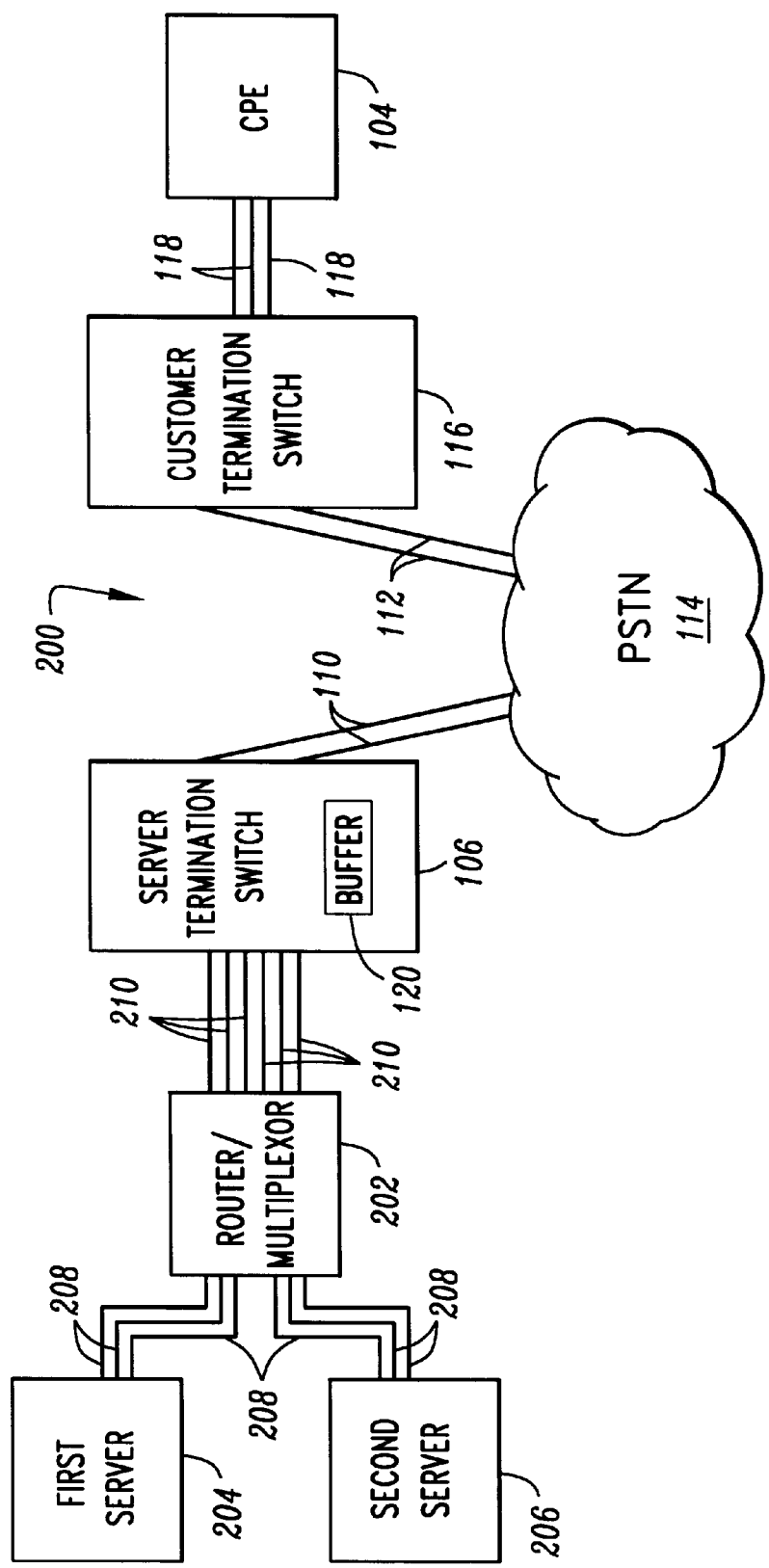
FIG. 2 is an apparatus including a router/multiplexor for data communications in accordance with the present invention.

FIG. 2 is a block diagram of an alternate preferred embodiment of a system 200 in accordance with the present invention. System 200 includes customer premises equipment 104, customer termination switch 116, public switched telephone network 114 and server termination switch 106, all coupled together in the manner described above with respect to FIG. 1. System 200 includes a router/multiplexor 202 that interfaces a first server 204, for example, a server in an Internet application, and a second server 206, for example, another server in an Internet application, to server termination switch 106 for placing suppressed ringing connections to customer premises equipment 104. Preferably router/multiplexor 202 is coupled to server termination switch 106 via suppressed ringing trunks 210. That is, the trunks 210 are dedicated for suppressed ringing connections. Alternatively, trunks 210 are capable of making non-suppressed ringing connections or suppressed ringing connections by an indication made during call set up. Servers 204, 206 are coupled to router/multiplexor 202 via a plurality of channels 208. In accordance with the present invention, router/multiplexor 202 receives the plurality of channels 208 from server 204 and server 206 and multiplexes the information contained thereon onto suppressed ringing connections placed over trunks 210 to a customer premises equipment 104.

Router/multiplexor 202 is preferably implemented with a processor, memory and a data switching network for receiving channels of data from server 204 and connecting the channels of data to trunks 210. Router/multiplexor 202 advantageously relieves server 204 from a complex routing and multiplexing function for use with delivery of information over multiple channels to a customer premises equipment. In particular, router/multiplexor 202 may route channels of information from both server 204 and server 206 to a single customer premises. Alternatively, router/multiplexor 202 may route single or multiple channels from servers 204, 206 to multiple customer premises, for example, in a broadcast operation. Though only two servers are shown coupled to router/multiplexor 202 in FIG. 2, many servers or a single server may be coupled to router/multiplexor 202.

In FIG. 2, server termination switch 106 includes buffer 120, as discussed above. Alternatively, the buffer function provided by buffer 120 is included in router/multiplexor 202 or is distributed among server termination switch 106 and router/multiplexor 202. Buffering is used to adjust for different data rates across the various data communications paths.

Figure 3:
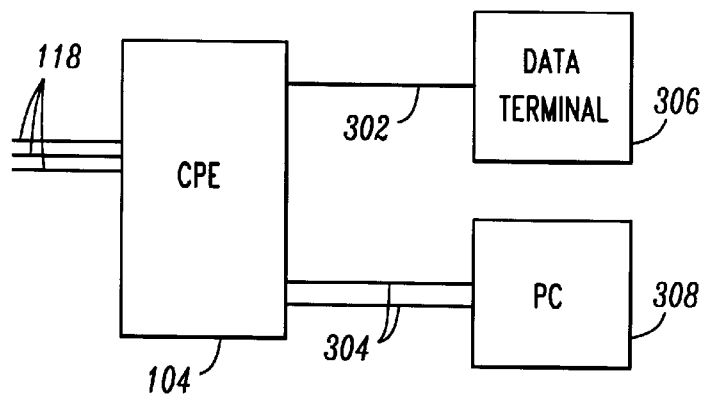
FIG. 3 is a block diagram of a customer premises equipment for routing data in accordance with the present invention.

FIG. 3 illustrates an arrangement for a customer premises equipment 104 to route channels of data in accordance with the present invention. A data terminal 306 and a personal computer 308 are coupled to customer premises equipment 104 via line 302 and lines 304, respectively. Lines 302, 304 are preferably serial data communications lines. Customer premises equipment 104 receives channels of data over the suppressed ringing connections established over lines 118 and distributes the channels of data to data terminal 306 and personal computer 308. In a preferred embodiment of the present invention, the channels of information travelling over lines 118 include control and routing information that is used by customer premises equipment 104 to distribute the streams of data to the appropriate devices at the customers premises.

The channels of data received over lines 118 may be received in a variety of multiplexed and non-multiplexed formats. For example, each of the three lines 118 may carry a single logical channel of data, or one or more lines 118 may carry more than one logical channel of data with each channel being multiplexed onto the same line. The channels of data distributed to line 302 and lines 304 may also be multiplexed or non-multiplexed. For example, line 302 may carry a single or multiple channels of data, the multiple channels being multiplexed. In a preferred embodiment, each channel of data on lines 304 is associated with a window or program on personal computer 308.

Figure 4:
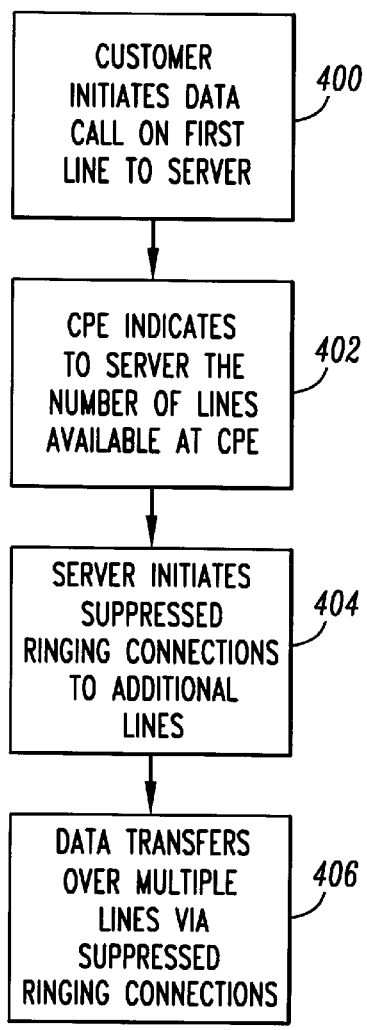
FIG. 4 is a flow chart illustrating a method in accordance with the present invention.

The operations for establishing suppressed ringing connections to provide multiple physical channels for data communication are described below with respect to FIG. 4. The operations are described within the context of a computer with a modem at a customers premises connecting to a remote server for data communications, such as an Internet connection.

First, the customer initiates a call on the computer to the remote server (400). This typically entails a dial-up connection on a first line of the plurality of lines 118. Preferably this is a traditional telephone connection. Alternatively, the remote server initiates a call to a customer premises equipment without user interaction, for example, by an automated system, at a designated time or upon the occurrence of a predetermined event, preferably using a suppressed ringing connection.

Then the customer premises equipment indicates to the server that a number of lines are available for a high-speed data transfer (402). The server needs to know the number of lines available for the high-speed data transfer to coordinate subsequent telephone connections to the available telephone lines. As an alternative to indicating the number of lines available for a connection, the number of lines available is stored on the server and associated with a customer or connection. That is, the number of available lines is pre-subscribed.

After determining how many lines are available for a connection, the server initiates a suppressed ringing connection to the additional lines (404). In particular, a no ring access is made to a user's line regardless of the features assigned to that line. For example a connection is made to the user's line in spite of call forwarding features, call blocking features, or vacation service. The suppressed ringing connection is indicated to the telephone network implicitly based on the trunk or line employed by the server to place the call or based on an indication made during call set up. To initiate the calls over a special trunk for suppressed ringing, the server goes off hook and seizes the suppressed ringing trunk and outpulses the required set-up data, including a destination number and billing number. If the user's line is not busy, a connection is cut through. Abbreviated ringing may be required if loop carrier equipment is in the path. Once the server receives acknowledgement that the connection is cut through, the customer premises equipment is alerted via a frequency shift keying data stream, tone or other alert.

After the connections are established, the multiple lines are used for a data transfer via the suppressed ringing connections (406). The server and the customer premises equipment coordinate the transfers over the multiple lines based on availability of a line and the size of a data transfer required. In particular, in a preferred embodiment, where the multiple lines at a customer's premises are used for data communications and voice communications, the customer premises equipment coordinates the connection and disconnection of suppressed ringing connections to allow voice communication over a line.

The invention provides a basic data communications capability that is useful in various applications. One example application is an information delivery service to a data communications terminal at a residence or business, where the data communications terminal displays the delivered information in text, graphics, video and audio. In this application a suppressed ringing connection is made from a server to a data communications terminal to transmit information, for example, breaking news. The information delivery service utilizes multiple lines for data communications in accordance with the specific information to be communicated. More specifically, multiple lines are added or dropped for data communications in accordance with an increase or decrease in the data to be transmitted. For example, if the breaking news includes a video clip, multiple lines may be used to facilitate transfer of voluminous video data and one or more lines is dropped following transfer of the video data. Also, additional information content may be available to a customer by selecting an option at the data communications terminal. Rather than initiate ringing connections alternatively during the delivery of information over multiple lines, suppressed ringing connections are made to seamlessly integrate delivery of information and coordination of line usage. Most preferably, the data communications terminal coordinates voice and data usage on multiple lines automatically without user interaction, so that lines not being used for data are available for voice connections and so that suppressed ringing connections are interrupted for voice communication needs. Also, if a line is busy, another available line is used for a suppressed ringing connection.

The invention provides an improved method of data communications over multiple telephone lines using suppressed ringing connections. By virtue of suppressed ringing connections, a customer is not alerted when data communications are established.

The invention being thus described, it will be evident that the same may be varied in many ways. Such variations are not to be regarded as a departure from the spirit and scope of the invention and all such modifications are intended to be included within the scope of the appended claims.

What is claimed is:

1. An method for establishing data communications comprising the steps of:
    A) establishing a plurality of suppressed ringing connections between a customer premises equipment and a server; and
    B) transmitting data between the customer premises equipment and the server over the plurality of suppressed ringing connections.

2. The method of claim 1 wherein the customer premises equipment comprises one of a modem, computer and data communications terminal.

3. The method of claim 1 wherein the data transmitted between the server and the customer premises equipment is part of an information delivery service.

4. The method of claim 1 wherein the data transmitted over the plurality of suppressed ringing connections is multiplexed logical channels of data.

5. The method of claim 1 further comprising the step of:
    C) terminating one of the plurality of suppressed ringing connections for voice communication over the one of the plurality of suppressed ringing connections.

6. The method of claim 1 further comprising the step of:
    C) establishing an additional suppressed ringing connection between the server and the customer premise equipment in response to a line connected to the customer premises equipment becoming not busy.

7. The method of claim 4 wherein each of the multiplexed logical channels of data is associated with a window on a computer.

8. The method of claim 1 further comprising the step of:
    C) distributing the data received by the customer premise equipment to a plurality of data communications devices.

9. The method of claim 1 further comprising the step of:
    C) buffering the data transmitted between the customer premises equipment and the server.

10. The method of claim 1 wherein the plurality of suppressed ringing connections includes a plurality of lines coupled to the customer premises equipment.

11. The method of claim 10 wherein the data transmitted includes a plurality of logical channels of data.

12. The method of claim 11 wherein each of the plurality of lines coupled to the customer premises equipment transmits one of the plurality of logical channels of data.

13. The method of claim 1 wherein at least one of the plurality of suppressed ringing connections is established by the server initiating a call to the customer premises equipment.

14. The method of claim 1 further comprising the step of:
    C) establishing an additional suppressed ringing connection between the server and the customer premises equipment in response to an increase in data to be transmitted between the server and the customer premises equipment.

15. The method of claim 1 further comprising the step of:
    C) terminating one of the plurality of suppressed ringing connections in response to a decrease in data to be transmitted between the server and the customer premises equipment.

16. An apparatus for data communications comprising:
- a server with a plurality of channels for data communications;
- a customer premises equipment;
- a plurality of telephone lines connected to the customer premises equipment;
- a suppressed ringing connection coupling at least one of the plurality of channels of the server with the plurality of telephone lines connected to the customer premises equipment whereby data communications is accomplished between the server and the customer premises equipment.

17. The apparatus of claim 16 wherein the customer premises equipment comprises one of a modem, computer and data communications terminal.

18. The apparatus of claim 16 wherein the server is coupled to a telecommunications switch and the telecommunications switch is coupled to a public switched telephone network.

19. The apparatus of claim 18 wherein the telecommunications switch comprises a buffer that stores data from the plurality of channels.

20. The apparatus of claim 18 wherein the server is coupled to the telecommunications switch by a trunk.

21. The apparatus of claim 20 wherein the trunk facilitates digital communications.

22. The apparatus of claim 20 wherein the trunk facilitates analog communications.

23. A method for data communications comprising the steps of:
- A) establishing a first data communications connection between a first computer and a second computer at a customer premises;
- B) determining a number of lines available at the customer premises for data communications;
- C) making suppressed ringing connections to at least one line of the number of available lines at the customer premises;
- D) transferring data over the first data communications connection and the at least one line.

24. The method of claim 23 wherein the data is multiplexed logical channels of data.

25. The method of claim 23 wherein the first data communications connection is established at a predetermined time without interaction from a user.

26. The method of claim 23 further comprising the step of:
- E) terminating one of the suppressed ringing connections to the at least one line.

27. The method of claim 23 further comprising the step of:
- E) making another suppressed ringing connection to another line of the number of available lines.

28. The method of claim 23 wherein the number of available lines at the customer premises is stored on the first computer.

29. An apparatus for data communications comprising:
- a first computer with a first plurality of channels of data;
- a router/multiplexor coupled to the first computer to receive the first plurality of channels of data from the first computer;
- a plurality of lines capable of making a suppressed ringing telephone connection, the plurality of lines being coupled to the router/multiplexor and a public switched telephone network;
- wherein the router/multiplexor distributes the first plurality of channels of data from the first computer over the plurality of lines using a plurality of suppressed ringing connections to a single customer premises equipment.

30. The apparatus of claim 29 further comprising:
- a second computer with a second plurality of channels, the second plurality of channels being coupled to the router/multiplexor;
- wherein the router/multiplexor distributes the second plurality of channels of data from the second computer over the plurality of lines using a plurality of suppressed ringing connections to a single customer premises equipment.

31. The apparatus of claim 29 wherein the single customer premises equipment distributes the first plurality of channels of data to a plurality of data communications devices.

32. The apparatus of claim 31 wherein the plurality of data communications devices comprises one of a computer, modem and data communications terminal.

* * * * *